Dec. 8, 1953  G. ALFIERI  2,661,726
FLUID PRESSURE MOTOR
Filed Feb. 28, 1948  2 Sheets-Sheet 1
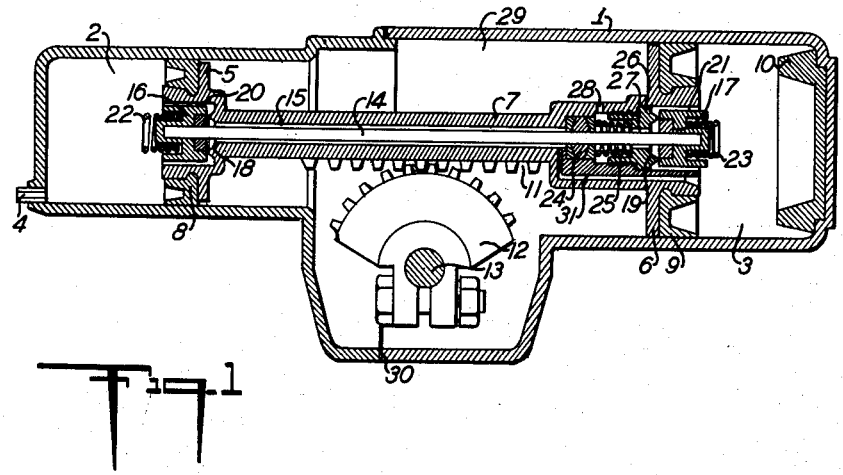
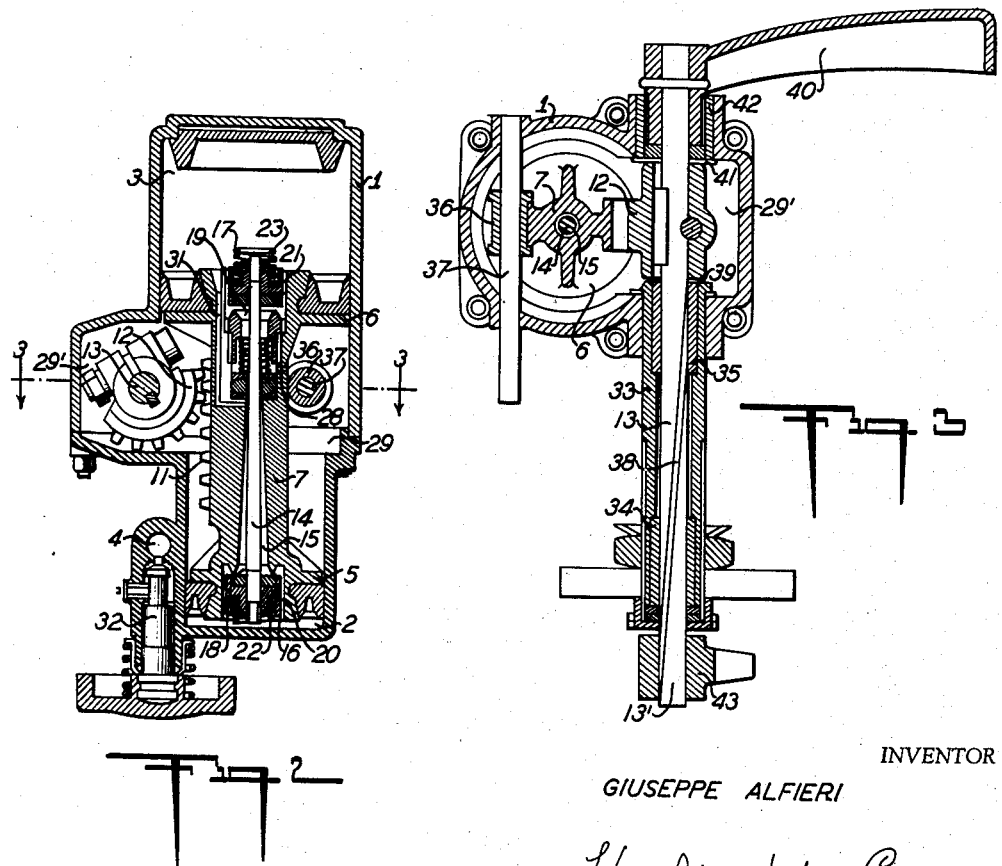
INVENTOR
GIUSEPPE ALFIERI
BY Haseltine Lake & Co.,
AGENTS

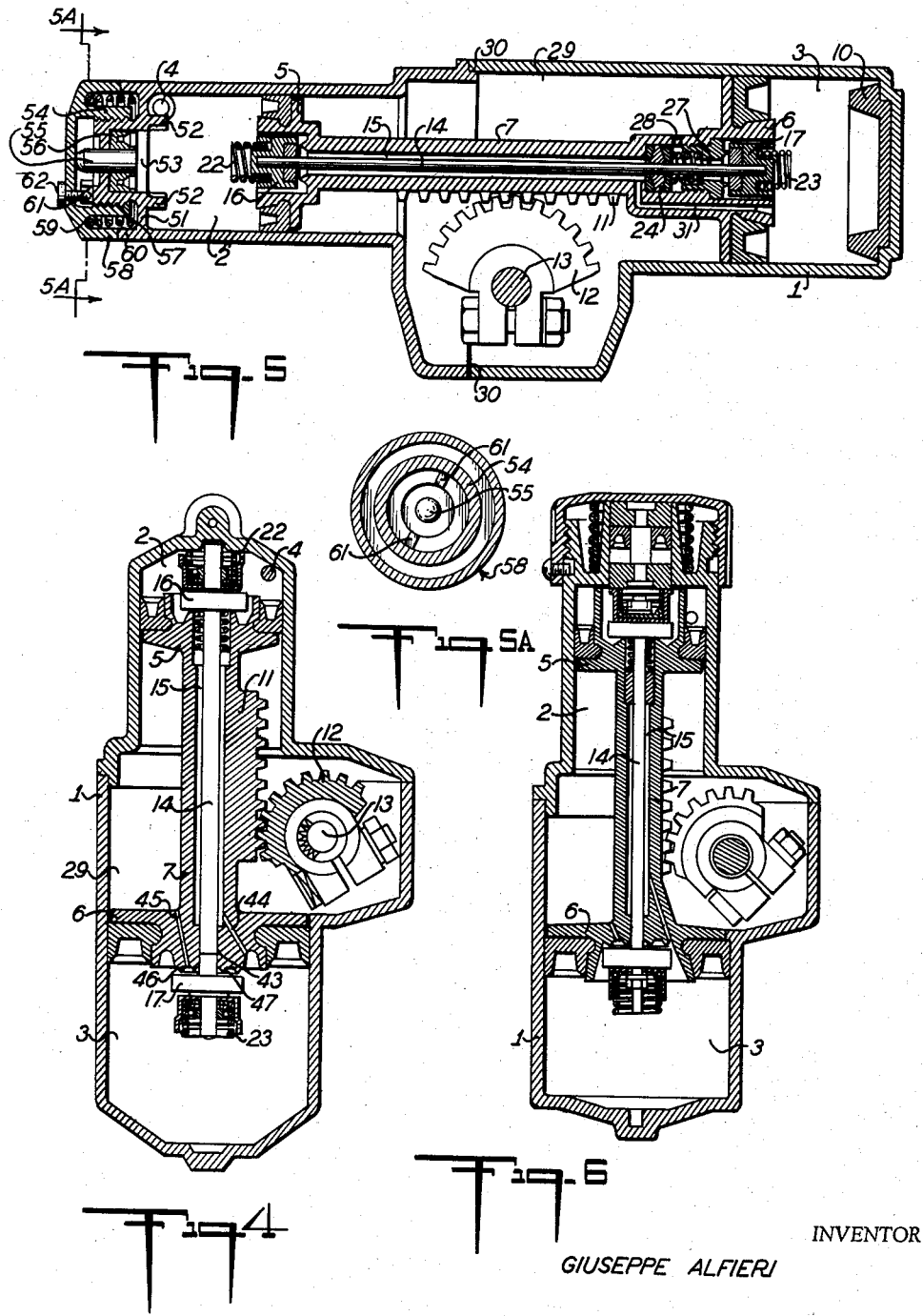

Patented Dec. 8, 1953

2,661,726

UNITED STATES PATENT OFFICE 2,661,726

FLUID PRESSURE MOTOR

Giuseppe Alfieri, Milan, Italy

Application February 28, 1948, Serial No. 12,125
In Italy March 18, 1941

Section 1, Public Law 690, August 8, 1946
Patent expires March 18, 1961

6 Claims. (Cl. 121—123)

This invention relates to reciprocating pressure fluid operated motors of the type used in actuating windshield wipers or other similar vehicle accessories.

A general object of this invention is to provide a pressure fluid operated motor of the type described which is simple and compact in construction and trouble-free in operation.

According to features of this invention, the above general object is realized by providing a pressure fluid operated motor including a casing formed with two opposed cylinders of different diameter, each having a piston working therein, and a hollow connecting rod extending between the pistons so that the latter move as a unit. A pressure fluid inlet is formed in the cylinder of smaller diameter so that the piston therein is continuously exposed to the pressure fluid, and a pressure fluid passageway extends through the connecting rod for communicating the larger diameter cylinder with the smaller diameter cylinder. A pressure fluid exhaust is provided in the piston working in the larger diameter cylinder, and communicates with the section of the casing between the cylinders, which section is open to the atmosphere. A valve stem extends slidably through the connecting rod and the pistons, and the stem carries a first valve at the end extending into the smaller diameter cylinder for closing the pressure fluid passageway and a second valve at the end extending into the larger diameter cylinder for closing the pressure fluid exhaust therefrom. The stem is of such length that the valves at the opposite ends thereof are alternately seated, and further the stem is provided with resilient bumpers at its opposite ends engageable with the respective cylinder heads, when the pistons reach the ends of their stroke in each direction, to thereby shift the valve stem for actuating the valves. Therefore, the pressure fluid entering the smaller cylinder will initially seat the first valve, which causes unseating of the second valve, so that the pressure fluid passageway to the larger cylinder is closed and the exhaust from the latter is open, and the piston unit is driven in the direction towards the larger cylinder by the pressure fluid in the smaller cylinder acting against the piston in the latter. When the piston unit reaches the limit of its stroke towards the larger cylinder, the bumper on the end of the valve stem extending through the larger piston engages the head of the larger cylinder and shifts the stem for opening the pressure fluid passageway and closing the pressure fluid exhaust. The larger cylinder is thereby filled with pressure fluid, and since the area of the larger piston is greater than that of the smaller piston, a resultant force will be applied to the piston unit for moving the latter back to its initial position. At the limit of this reverse movement, the valve stem is again displaced to close the pressure fluid passageway and open the exhaust passageway. Thus the piston unit continuously reciprocates in the casing.

Further, according to this invention, the connecting rod is formed with a gear rack thereon, which meshes with a gear segment disposed in the non-pressurized section of the casing between the cylinders and fixed on the shaft driving a windshield wiper or the like for oscillating the latter. The gear rack on the connecting rod, the gear segment, and the shaft form transmission means for transmitting the reciprocation of the piston unit to the driven unit, and since such transmission means are disposed in the non-pressurized section of the casing, no sealing glands or other similar sealing means are required at the points where the shaft extends out of the casing.

Another object of this invention is to provide a pressure fluid operated motor having the characteristics and features noted above, wherein the driven shaft is formed with a suitable passageway for communicating the section of the casing between the cylinders with the atmosphere, so that the exhaust of pressure fluid from the larger cylinder will be at a point remote from the casing; and in particular, when the shaft operates a windshield wiper, so that the exhaust of such pressure fluid will be at the end of the shaft outside of the vehicle.

A further object is to provide a pressure fluid operated motor having a driven shaft formed with a pressure fluid exhausting passageway, wherein such pressure fluid exhausting passageway is so formed as to effect ejection of condensate forming within the casing.

Still another object is to provide a pressure fluid operated motor of the kind described wherein the valve for closing the exhaust passageway from the larger cylinder, when seated, effectively seals such exhaust passageway from communication with the pressure fluid passageway extending through the hollow connecting rod, so that no sealing means are required around the valve stem, thereby simplifying the construction and reducing the frictional forces to be overcome in moving the valve stem.

A still further object is to provide a pressure fluid operated motor of the class described including stopping means for rendering the motor inoperative, wherein such stopping means effect the immobilization of the piston unit at the limit of its movement in one direction, and wherein the stopping means is constructed so that the pressure fluid acts upon the pistons to maintain the piston unit in such immobilized position, with the valve stem and valves in the position corresponding to that of the stroke just ended.

These and other objects, features and advantages of the invention will appear in the following detailed description of several illustrative embodiments thereof, which description is to be read in conjunction with the accompanying drawings forming a part thereof, and wherein:

Fig. 1 is a longitudinal, sectional view along the axes of the cylinders of a pressure fluid operated motor constructed according to an embodiment of this invention;

Fig. 2 is a longitudinal sectional view along the axes of the cylinders of a pressure fluid operated motor constructed according to another embodiment of this invention, and including a driven shaft constructed to exhaust the pressure fluid at a point remote from the motor casing;

Fig. 3 is a transverse, sectional view taken along the line 3—3 of Fig. 2;

Fig. 4 is a longitudinal, sectional view along the axes of the cylinders of a pressure fluid operated motor constructed according to still another modification of the invention, wherein the valve closing the exhaust port from the larger cylinder also isolates the exhaust passageway relative to the pressure fluid passageway;

Fig. 5 is a longitudinal, sectional view of a pressure fluid operated motor similar to the form illustrated in Fig. 1, and including a stopping mechanism carried by the head of the smaller cylinder;

Fig. 5A is a view partly in section taken along the line 5A—5A of Figure 5; and

Fig. 6 is a longitudinal, sectional view of a pressure fluid operated motor combining the valve formation of the form illustrated in Fig. 4 and the stopping mechanism of the modification illustrated in Fig. 5.

Referring initially to Fig. 1 of the drawings, the pressure fluid operated motor there illustrated includes a two-section casing 1 formed with opposed cylinders of different diameters in the respective sections thereof. The cylinders are axially aligned and open towards each other, with the cylinder of smaller diameter, hereinafter referred to as the "smaller cylinder," being indicated by reference numeral 2, and with the cylinder of larger diameter, hereinafter referred to as the "larger cylinder," being indicated by the reference numeral 3. Cylinders 2 and 3 are spaced apart at their confronting open ends and open into an enlarged section 29 of the casing 1 corresponding to a crankcase. Smaller cylinder 2 is provided with a pressure fluid inlet 4, in the head thereof, for connection to a source of pressure fluid (not shown). Pistons 5 and 6, of suitable diameter, work in cylinders 2 and 3, respectively, and are rigidly connected together by a hollow connecting rod 7 so that pistons 5 and 6 reciprocate in unison, with pistons 5 and 6, and connecting rod 7 hereinafter being referred to as a "piston unit." The pistons 5 and 6 are provided with annular packings 8 and 9, respectively, of conventional form for sealing the pistons relative to their respective cylinders. A disk 10 is fixed to the head of cylinder 3 and is formed with a marginal rib or ridge dimensioned to be received in the annular recess of packing 9 to thereby diminish the dead space in cylinder 3 when the piston unit has reached the limit of its stroke towards the larger cylinder.

Connecting rod 7 is formed with a series of longitudinally spaced teeth on the exterior thereof constituting a gear rack 11 which meshes with a spur gear segment 12 fixed to shaft 13. Shaft 13 is journalled in the casing 1, for reciprocation about an axis disposed at right angles to the axes of the cylinders and offset therefrom, and extends out of the casing for connection to a windshield wiper (not shown) or other vehicle accessary operated by an oscillating driving shaft. It is apparent that gear rack 11 and gear segment 12 are effective to transmit reciprocatory motion of the piston unit to the driving shaft 13, for oscillating the latter.

In order to provide for the reciprocation of the piston unit, the pressure fluid operated motor of Fig. 1 further includes a system for selectively and automatically controlling the distribution of pressure fluid in the respective cylinders. This system includes a bore 15 extending axially through connecting rod 7 and opening at one end into counter-bored chamber 20, of increased diameter, formed in the outer surface of piston 5. The bore 15 is enlarged adjacent its other end and opens into a counter-bore 21 of increased diameter formed in the face of piston 6. A valve stem 14, of substantially smaller diameter than that of bore 15, extends loosely through the latter, with an annular passageway being defined between the stem and the surface of the bore. A ferrule 26 is threaded into the enlarged portion of bore 15 and is formed with a central opening through which stem 14 loosely extends leaving an annular space 27 therebetween. Counter-bore 20 is formed with an annular ridge on its bottom surface around the opening to bore 15 to provide a valve seat 18, and ferrule 26 is formed with a similar annular ridge on its outer face, extending into counter-bore 21, to provide a valve seat 19. Valve members 16 and 17 are fixed on the opposite ends of stem 14 for seating against valve seats 18 and 19, respectively. As seen in Fig. 1, valve members 16 and 17 have diameters that are less than the diameters of counter-bores 20 and 21 so that the valve members may work in the respective counter-bores while providing an annular space for the passage of pressure fluid. Further, valve members 16 and 17 are so positioned on the stem that the valve members are alternatively seated. That is, when stem 14 is positioned to seat valve 16 on seat 18, valve 17 is removed from seat 19, and when stem 14 is positioned to seat valve 17 on seat 19, valve 16 is unseated.

Packing 24 is disposed in the enlarged portion of bore 15, with stem 14 extending slidably therethrough, and is urged against the shoulder, formed between the enlarged portion of the bore and the smaller portion thereof, by spring 25 abutting against the inner surface of ferrule 26. Packing 24 then isolates the passageway formed between bore 15 and stem 14, and opening into counter-bore 20, from the chamber defined between the enlarged portion of the bore and stem 14, and opening through annular space 27 into counter-bore 21.

A by-pass 31 is formed in connecting rod 7 and piston 6, opening at its opposite ends into cylinder 3 through the face of piston 6 and into bore 15 ahead of packing 24. By-pass 31 and the portion of bore 15 opening into counter-bore 20, provide communication between cylinders 2 and 3 when valve 16 is unseated and are hereinafter collectively referred to as the "pressure fluid passageway." A port 28 is formed radially in connecting rod 7 and opens at its opposite ends into the casing section between cylinders 2 and 3 and into the enlarged portion of the bore between ferrule 26 and packing 24. Annular passageway 27, the enlarged portion of the bore, and port 28 provide communication between cylinders 2 and 3, when valve 17 is unseated, and are hereinafter collectively referred to as the "pressure fluid exhaust passageway." A leak passage 30, in the form of a slot, opens the casing section between the cylinders to the atmosphere.

Finally, coil springs 22 and 23 are fixed on the opposite ends of stem 14, outwardly of pistons 5 and 6, respectively, for engagement with the cylinder heads at the opposite extremes of the stroke of the piston unit to effect shifting of valve stem 14.

Operation of the pressure fluid operated motor illustrated in Fig. 1 is as follows:

Pressure fluid, such as compressed air, is introduced into cylinder 2 through inlet 4. The pressure fluid in cylinder 2 acts against valve 16 to seat the latter and thereby close the pressure fluid passageway to cylinder 3. With valve 16 seated, valve 17 is unseated to open the pressure fluid exhaust passageway from cylinder 3. The pressure fluid in cylinder 2 also acts against piston 5 to move the latter and the other elements of the piston unit toward cylinder 3, or toward the right as viewed in Fig. 1. Such movement of the piston unit is transmitted by meshing gear rack 11 and gear segment 12 to shaft 13 thereby rocking the shaft clockwise. When the piston unit reaches the limit of its movement toward cylinder 3, spring 23 engages the head of the latter, and valve stem 14 is thereby moved relative to the piston unit to seat valve 17 and unseat valve 16. With the valves so disposed, the exhaust passageway from cylinder 3 is closed, and the pressure fluid passageway from cylinder 2 to cylinder 3 is open to lead pressure fluid into the latter. Since the area of piston 6 is greater than that of piston 5, the pressure fluid acting in opposite directions against both will provide a resultant force which acts on the piston unit to move the latter back towards cylinder 2, or toward the left as the motor is viewed in Fig. 1. This return movement of the piston unit is transmitted by gear rack 11 and gear segment 12 to rock shaft 13 counter-clockwise. When the piston unit approaches the limit of its movement towards cylinder 2, spring 22 engages the head of the latter to shift stem 14 relative to the piston unit for seating valve 16 closing the pressure fluid passageway, and for unseating valve 17 opening the pressure fluid exhaust passageway from cylinder 3. The pressure fluid then only acts against piston 5 to move the piston unit back towards cylinder 3, and as the piston unit is so moved, the pressure fluid in cylinder 3 is exhausted therefrom through the exhaust passageway into the casing section between the cylinders and thence to the atmosphere through slot 30. Thus the piston unit is automatically reciprocated in the casing and shaft 13 is correspondingly oscillated.

As previously indicated, disk 10 fits into the annular recess of packing 9, when the piston unit reaches the limit of movement towards the head of cylinder 3, to thereby decrease the dead space in the latter. A similar disk is not required in cylinder 2, since pressure fluid is continuously present in the latter.

It is preferred that piston 6 be formed with an area twice that of piston 5 so that the force applied to shaft 13 will be the same during the movement in both directions.

Referring now to Figs. 2 and 3, a modified pressure fluid operated motor constructed according to this invention is there illustrated, which is similar in its major components to the motor shown in Fig. 1 and described above. The motor shown in Figs. 2 and 3 includes a casing 1 formed with opposed cylinders 2 and 3 of different diameters opening into the intermediate section 29. The intermediate section of this casing is distinguished from that of the motor first described in that it is not provided with an opening to the atmosphere. As in the motor shown in Fig. 1, a piston unit works in the casing, and includes a piston 5 in cylinder 2, a piston 6 in cylinder 3 and a hollow connecting rod 7. A valve assembly, similar to that already described, is carried by the piston unit and alternately opens and closes the pressure fluid passageway between cylinder 2 and cylinder 3 and the pressure fluid exhaust passageway from cylinder 3 to casing section 29. The several passageways, and structure by which they are defined, are similar to those previously detailed, a gear rack 11 is formed on connecting rod 7 and meshes with gear segment 12 fixed on shaft 13 which extends into a lateral extension 29' of the intermediate casing section 29.

The motor of Figs. 2 and 3 is distinguished from that previously described in the following respects. A valve 32 is interposed between the pressure fluid inlet 4 and the port opening into cylinder 2. Valve 32 is of conventional construction and serves to control the rate of flow of pressure fluid into cylinder 2 and hence the speed of the movement of the piston unit.

A shaft 37, extending parallel to shaft 13, is fixed in the intermediate casing section 29 and extends out of the casing at one end to provide a mounting member. Shaft 37 is at the side of rod 7 removed from rack 11 and rotatably carries a grooved roller 36 in engagement with the connecting rod to stabilize the piston unit during its reciprocation.

An open ended tubular sleeve 33 (Fig. 3) extends fixedly from portion 29' of the casing, with the shaft 13 rotatable therein, and projects out of the compartment within which the casing 1 is mounted. Bearings 34 and 35 are carried at the opposite ends of tubular sleeve 33 for supporting shaft 13 in the latter. A bearing 42 is carried by casing section 29' and supports the inner end of shaft 13, which inner end carries an operating hadle 40. Packing 41 seals casing section 29' around the inner end of shaft 13. The arm 43 of a windshield wiper (not shown) is fixed to the outer end 13' of the oscillated shaft at the outside of the motor containing vehicle compartment.

To provide for the exhaust of pressure fluid from casing sections 29 and 29' to the atmosphere at a point outside of the compartment housing the motor, a groove 38 is formed in the surface of shaft 13 and extends from inwardly of bearing 35, where it opens into gap 39 between the hub of gear segment 12 and the bearing, to communicate with the casing sections 29 and 29'; to the outer end 13' of the shaft where it opens to atmosphere.

The groove 38 is preferably screw shaped, as shown in Fig. 3, to provide better distribution of the friction of the side edges thereof upon the surfaces of bearings 34 and 35. The screw shape of groove 38 in oscillated shaft 13 has the further advantage of promoting the ejection of ice formations that may be formed from the condensate carried by the pressure fluid (such as compressed air) when it is being exhausted. To obtain the greatest advantage of the specific construction here set forth, the casing should be mounted with the section 29' lowermost, so that condensate will drain into this section, and the groove 38 should preferably be positioned on the shaft so that the inner end of the groove will be lowermost when the blade arm 43 is at one of the extremes of its movement. Thus condensate will not rise in section 29' above the lower edge of shaft 13, and cannot accumulate sufficiently to enter cylinders 2 and 3 and interfere with operation of the motor. It has been found that the pitch of screw shaped groove 38 is preferably twice the length the section of shaft 13 in which it is formed for optimum ejection of condensate.

While the illustrated embodiment shows groove 38 formed in the surface of shaft 13, which arrangement is preferable, exhaust of the pressure fluid at a point external of the vehicle compartment in which the motor is mounted could be obtained by forming the groove in bearings 34 and 35, or by providing shaft 13 with an axial internal passageway, these latter variations not being illustrated.

Referring now to Fig. 4, a pressure fluid operated motor is there illustrated in which the valve assembly and the pressure fluid passageway and pressure fluid exhaust passageway are constructed and arranged to avoid the necessity of providing packing, similar to packing 24 in Fig. 1, to isolate the pressure fluid passageway from the exhaust.

The motor shown in Fig. 4 includes a casing 1 having opposed cylinders 2 and 3 of different diameters opening into the intermediate section 29, a pressure fluid inlet 4 opening into cylinder 2, pistons 5 and 6 working in cylinders 2 and 3, respectively, a connecting rod 7 joining the pistons, a gear rack 11 formed on the connecting rod, and a gear segment 12 meshing with rack 11 and fixed to the driven shaft 13.

The pressure fluid passageway in this modified form includes a bore 15 extending axially through the connecting rod 7 and opening at one end through the face of piston 5. The bore 15 is formed with a portion of reduced diameter, or constriction 43, at its other end, and a valve stem 14 extends through bore 15 and is slidable within constriction 43. The pressure fluid passageway is completed by a bore 44, inclined relative to the axis of the connecting rod, which opens at one end into bore 15 ahead of constriction 43 and at the other end through the face of piston 6 at a point spaced radially from the center thereof.

Piston 5 is formed with an annular ridge on the outer face thereof concentric with the open end of bore 15, to provide a valve seat, and piston 6 is provided with two radially spaced annular ridges or ribs 46 and 47, on the outer face thereof, concentric with the axis of stem 14. The outermost rib 46 is spaced inwardly from the end of passageway 44 opening into cylinder 3. An exhaust passageway 45 is formed in piston 6 and opens at one end into the casing section 29, which is vented to the atmosphere in the manner of the motors shown in either Fig. 1 or Fig. 2, and at the other end into the channel formed in the face of piston 6 between annular ribs 46 and 47.

The valve assembly includes valve members 16 and 17, of disk-like configuration, arranged on the opposite ends of stem 14 for alternate seating, respectively, against the annular rib on piston 5, to close the pressure fluid passageway between cylinder 2 and cylinder 3, and against ribs 46 and 47 on piston 6. When valve member 17 seats against ribs 46 and 47, the channel defined between these ribs is closed, thus isolating exhaust passageway 45 from cylinder 3 as well as from the opening in piston 6 through which stem 14 extends. Therefore, by reason of the specific construction of its seat, valve 17, when seated, serves the dual function of closing the exhaust from cylinder 3, and also of isolating the exhaust from the pressure fluid passageway to thereby eliminate the necessity of packing 24 in the previously described modification which serves this latter function. As in the previous forms of the invention, springs 22 and 23 extend from the opposite ends of stem 14, and engage with the adjacent cylinder heads at the limits of the stroke of the piston unit to effect the shifting of the valve assembly. The operation of this modification is similar to that previously described in connection with the motor illustrated in Fig. 1.

Referring now to Fig. 5, a pressure fluid operated motor is there shown which is similar in construction to the device illustrated in Fig. 1, with the exception of the head of cylinder 2, that is, the cylinder of smaller diameter.

In this modified form, a stopping assembly is incorporated in the head of the smaller cylinder so that the piston unit may be selectively retained at the end of its stroke toward cylinder 2. The stopping of the piston unit in this position is achieved by selectively removing the portion of the head against which spring 22 is engageable from the path of travel of the spring so that the valve stem 14 is not shifted at the end of the stroke to close the pressure fluid passageway and open the exhaust passageway from cylinder 3.

In the preferred embodiment, the stopping assembly includes wings or gills 52 projecting axially from the end 51 of cylinder 2 adjacent the side wall of the latter towards the piston 5 for engagement with the latter. Wings 52 serve to limit the movement of the piston unit towards cylinder 2. The wings 52 are disposed so as to permit spring 22 and the valve 16 to extend outwardly therebetween. End 51 of cylinder 2 is formed with a cylindrical chamber 54 opening into the cylinder between the wings 52 and slidably receiving a disc 53. A stem 55 is formed integral with disc 53 and extends outwardly through the end wall of chamber 54, and packing 56 extends around stem 55 to prevent leakage of the pressure fluid through the end wall of the chamber. A cap 58 is threaded, as at 57, onto the outer surface of the structure defining chamber 54, and engages the outer end of stem 55 to control the position of stem 55 and thereby that of disc 53. The threads 57 are held in frictional engagement, to prevent inadvertent turning of cap 58, by a coil spring 59, disposed in an annular channel 60 formed in the cap, and bearing against the cap and the end 51 of the cylinder. Rotation of cap 58 is limited by engagement of a screw 62 carried by the cap with a stop or lug 61 formed on the outer end of the structure defining chamber 54 and projecting into the path of travel of the screw.

The pressure fluid in cylinder 2 continuously acts against disc 53 to maintain stem 55 in engagement with cap 58, and the several parts described above are proportional and arranged so that, when the cap is screwed onto the cylinder 2, to the limit of its movement in that direction, disc 53 projects axially into the path of travel of spring 22 to shift valve stem 14 before the wings 52 engage piston 5, to thereby insure the normal operation of the motor as previously described. However, when the cap 58 is rotated to increase the distance between the inner surface thereof and the wings 52, the pressure fluid, acting against disc 53, moves the latter axially outward out of the path of travel of spring 22 when piston 5 abuts against wings 52. Thus, when the disc 53 is removed from the path of travel of spring 22, the resultant force derived from the action of the pressure fluid against both pistons 5 and 6 will retain the piston unit against wings 52, and the valve assembly will not be shifted at the end of the stroke from the position in which the pressure fluid passageway between cylinders 2 and 3 is open and the exhaust passageway from cylinder 3 is closed.

From the above, it will be seen that the piston unit is positively retained in the stopped, or inoperative position, by the pressure fluid, and therefore, the device operated by shaft 13 will be held in the inoperative position even when subjected to shocks or jarring.

To start the pressure fluid operated motor of Fig. 5, it is only necessary to screw cap 58 onto the cylinder head to thereby urge disc 53 against spring 22 and shift stem 14 for closing the pressure fluid passageway between the cylinders and for opening the exhaust passageway from cylinder 3. Then the device assumes the normal operation heretofore described.

The stopping assembly has been illustrated in connection with a motor constructed in accordance with the modification of Fig. 1, however, as illustrated in Fig. 6, the stopping assembly may be suitably incorporated in other motors of similar construction, as, for example, the illustrated pressure fluid operated motor having the passageways and valve assembly of Fig. 4, and the remote pressure fluid exhaust feature of Figs. 2 and 3.

Having thus described several preferred embodiments of this invention, it is to be understood that various changes and modifications, obvious to those skilled in the art, may be effected without departing from the scope of the invention which is intended to be defined in the appended claims.

I claim:

1. A reciprocating pressure fluid operated motor comprising a casing defining a pair of opposed cylinders of different diameters; a piston unit reciprocatable in said casing including a piston working in each of said cylinders and a connecting rod extending between said pistons; pressure fluid inlet means opening into the smaller of said cylinders so that the pressure fluid continuously acts against the piston in said smaller cylinder; a pressure fluid passageway for communicating said smaller cylinder with the larger of said cylinders and extending through said connecting rod and opening at one end through the piston in said smaller cylinder; a pressure fluid exhaust passageway for communicating said larger cylinder with the atmosphere and opening at one end into said larger cylinder through the piston in the latter; a valve seat on each of said pistons at the respective open ends of said passageways coaxial with each other and with the longitudinal axes of said pistons; valve means for closing said passageways carried by said piston unit and actuated by engagement with the heads of said cylinders when said piston unit approaches the limits of its travel in opposite direction including a first valve for seating against the seat on the piston in said smaller cylinder and a second valve for seating against the seat on the piston in said larger piston; and a valve stem extending through a bore in said connecting rod and carrying said first and second valves at the opposite ends thereof.

2. A reciprocating pressure fluid operated motor according to claim 1; wherein said bore opens at one end into said valve seat on the piston in the smaller cylinder to constitute a portion of said pressure fluid passageway; and including sealing means in said bore to prevent flow of pressure liquid into said larger cylinder around said second valve, a by-pass passage formed in said rod and said piston in the larger cylinder opening at its opposite ends into said larger cylinder and into said bore at a point ahead of said sealing means to complete said pressure fluid passageway, and an exhaust port formed in said rod and opening into the portion of said bore after said sealing means, said last mentioned portion of said bore opening into said valve seat on the piston in the larger cylinder and with said exhaust port constituting said pressure fluid exhaust passageway.

3. A reciprocating pressure fluid operated motor according to claim 1; including a fixed abutment in said smaller cylinder limiting the movement of said piston unit toward said smaller cylinder, and axially movable means carried by the head of said smaller cylinder engageable with said stem in one position to shift the position of the latter before said piston unit engages said fixed abutment and removed from the path of travel of said stem in an axially displaced position to render said motor inoperative with said piston unit against said fixed abutment.

4. A reciprocating pressure fluid operated motor according to claim 3; wherein said valves are positioned to open said pressure fluid passageway and to close said pressure fluid exhaust passageway during movement of said piston unit toward said smaller cylinder, whereby, when said axially movable means is in said axially displaced position, said valves retain their respective positions so that the pressure fluid continuously urges said piston unit against said fixed abutment.

5. A reciprocating pressure fluid operated motor according to claim 4; wherein said axially movable means includes an axially slidable stem extending through the head of said smaller cylinder, a disc on the inner end of said stem for engagement with the adjacent end of said valve stem, a cap threaded on said head and limiting outward movement of said axially slidable stem, means limiting the rotation of said cap, and spring means acting on said cap for frictionally retaining the latter in selected position.

6. A reciprocating pressure fluid operated motor comprising a casing defining a pair of opposed cylinders of different diameters; a piston unit reciprocable in said casing including a piston working in each of said cylinders and a connecting rod fixed between said pistons; pressure fluid inlet means opening into the smaller of said cylinders, a bore extending axially through said rod and open at its opposite ends through the outer faces of said pistons, a first valve seat formed at the end of said bore opening through the smaller piston, a portion of reduced diameter formed in the end of said bore adjacent the larger piston, a valve stem slidable in said bore and extending out of the opposite ends thereof, a by-pass formed in said rod and larger piston opening at one end into said bore ahead of said portion of reduced diameter and at the other end through the outer face of said larger piston at a point spaced radially from the adjacent open end of said bore, a pair of radially spaced apart ribs formed on the outer face of said larger piston concentric with said bore to provide a second valve seat, the outer one of said ribs being spaced inwardly from said other end of said by-pass, a pressure fluid exhaust passageway extending through said larger piston and opening through the outer face of the latter between said annular ribs, a first valve on one end of said stem for seating against said first seat and a second valve on the other end of said stem for seating against said pair of ribs to thereby isolate said exhaust passageway from said bore, said valves being disposed on said stem for alternate seating, and means on the opposite ends of said stem engageable with the heads of said cylinders to shift said stem axially at the end of the piston units travel in either direction.

GIUSEPPE ALFIERI.

References Cited in the file of this patent

UNITED STATES PATENTS

| Number | Name | Date |
|---|---|---|
| 220,625 | Knecht | Oct. 14, 1879 |
| 728,651 | Albright | May 19, 1903 |
| 885,462 | Fletcher | Apr. 21, 1908 |
| 907,250 | Lavoie | Dec. 22, 1908 |
| 1,142,551 | Burnhart | June 8, 1915 |
| 1,326,025 | Case | Dec. 23, 1919 |
| 1,348,800 | Hipkins et al. | Aug. 3, 1920 |
| 2,091,390 | Forman | Aug. 31, 1937 |
| 2,098,936 | Armstrong et al. | Nov. 16, 1937 |
| 2,147,150 | Conklin et al. | Feb. 14, 1939 |
| 2,345,433 | Simpson | Mar. 28, 1944 |
| 2,389,654 | Van Der Werff | Nov. 27, 1945 |
| 2,442,906 | Shay | June 8, 1948 |

FOREIGN PATENTS

| Number | Country | Date |
|---|---|---|
| 949 | Great Britain | Oct. 7, 1856 |
| 368,750 | France | Oct. 17, 1906 |
| 100,138 | Sweden | Aug. 29, 1940 |